(12) United States Patent
Ganesh et al.

(10) Patent No.: US 12,282,504 B1
(45) Date of Patent: Apr. 22, 2025

(54) SYSTEMS AND METHODS FOR GRAPH-BASED DYNAMIC INFORMATION RETRIEVAL AND SYNTHESIS

(71) Applicant: Harman Connected Services, Inc., Mountain View, CA (US)

(72) Inventors: Jai Ganesh, Bangalore (IN); Somdev Goswami, Bengaluru (IN); Ashutosh Vyas, Rajasthan (IN); Priyesha Chetan Kapadia, Maharashtra (IN); Vaishnavi Shiwankar, Maharashtra (IN); Adusumilli Sai Kiran, Andhra Pradesh (IN); Sahana H S, Bengaluru (IN); Dodla Mounya, Andhra Pradesh (IN); Aakash Tatoba Walavalkar, Maharashtra (IN)

(73) Assignee: HARMAN CONNECTED SERVICES, INC., Mountain View, CA (US)

( * ) Notice: Subject to any disclaimer, the term of this patent is extended or adjusted under 35 U.S.C. 154(b) by 0 days.

(21) Appl. No.: 18/651,274

(22) Filed: Apr. 30, 2024

(51) Int. Cl.
*G06F 16/30* (2019.01)
*G06F 16/334* (2025.01)
(Continued)

(52) U.S. Cl.
CPC .......... *G06F 16/35* (2019.01); *G06F 16/3347* (2019.01); *G06F 16/383* (2019.01)

(58) Field of Classification Search
CPC ..... G06F 16/35; G06F 16/3347; G06F 16/383
See application file for complete search history.

(56) References Cited

U.S. PATENT DOCUMENTS

| 11,880,379 B1* | 1/2024 | Newman | G06N 3/08 |
| 2020/0089758 A1* | 3/2020 | Reddi | G06F 40/242 |

(Continued)

FOREIGN PATENT DOCUMENTS

| CN | 115618113 A | * | 1/2023 |
| CN | 115982338 A | * | 4/2023 |

OTHER PUBLICATIONS

Article entitled "Query Resolution of Literature Knowledge Graphs using Hybrid Document Embeddings", by Muhammad et al., dated Dec. 13, 2022 (Year: 2022).*

(Continued)

*Primary Examiner* — Mahesh H Dwivedi
(74) *Attorney, Agent, or Firm* — McCoy Russell LLP

(57) ABSTRACT

Disclosed herein are systems and methods for graph-based dynamic information retrieval and synthesis, particularly for enhancing the response generation of chatbot applications using large language models (LLMs). The methods involve receiving a user query, generating a query embedding, and accessing a knowledge graph comprising nodes representing documents with associated document embeddings. A set of documents is retrieved based on similarity scores, and a distance matrix is constructed to calculate shortest-path distances between nodes. Documents are clustered to identify a largest cluster from which content is retrieved to formulate a response. The disclosed embodiments improve upon retrieval augmented generation (RAG) by leveraging the hierarchical relationships of a knowledge graph and node interconnectedness to provide contextually coherent information and mitigate the inclusion of information from irrelevant or superficially related documents in LLM responses.

20 Claims, 7 Drawing Sheets

(51) Int. Cl.
*G06F 16/35* (2019.01)
*G06F 16/383* (2019.01)

(56) References Cited

U.S. PATENT DOCUMENTS

| | | | | |
|---|---|---|---|---|
| 2022/0335270 | A1* | 10/2022 | Ma | G06N 3/088 |
| 2023/0070715 | A1* | 3/2023 | Pajak | G06N 3/09 |
| 2023/0237093 | A1* | 7/2023 | Li | H04N 21/4668 |
| | | | | 707/734 |
| 2024/0135391 | A1* | 4/2024 | Kaplunov | G06Q 30/018 |
| 2025/0036635 | A1* | 1/2025 | Newman | G06N 5/02 |

OTHER PUBLICATIONS

Article entitled "MedGraph: An experimental semantic information retrieval method using knowledge graph embedding for the biomedical citations indexed in PubMed", by Ebeid et al., dated 2021 (Year: 2021).*

Article entitled "Graph-based Clustering Algorithms—A Review on Novel Approaches", by Hloch et al., dated Jul. 10, 2021 (Year: 2021).*

Article entitled "CSO Classifier 3.0: A Scalable Unsupervised Method for Classifying Documents in Terms of Research Topics", by Salatino et al., dated Jul. 22, 2021 (Year: 2021).*

Pan, S. et al., Unifying Large Language Models and Knowledge Graphs: A Roadmap, ArXiv Cornell University Website, Available Online at https://arxiv.org/abs/2306.08302, Available as Early as Jun. 14, 2023, Last Revised Jan. 25, 2024, 28 pages.

* cited by examiner

|  | CHAPTER NODE 602 | SECTION NODE 604 | SECTION NODE 606 | SUB-SECTION NODE 608 | SUB-SECTION NODE 610 | SUB-SECTION NODE 612 | SUB-SECTION NODE 614 | SUB-SECTION NODE 616 |
| --- | --- | --- | --- | --- | --- | --- | --- | --- |
| CHAPTER NODE 602 | 0 | 1 | 1 | 2 | 2 | 2 | 2 | 2 |
| SECTION NODE 604 | 1 | 0 | 2 | 1 | 1 | 1 | 3 | 3 |
| SECTION NODE 606 | 1 | 2 | 0 | 3 | 3 | 3 | 1 | 1 |
| SUB-SECTION NODE 608 | 2 | 1 | 3 | 0 | 2 | 2 | 4 | 4 |
| SUB-SECTION NODE 610 | 2 | 1 | 3 | 2 | 0 | 2 | 4 | 4 |
| SUB-SECTION NODE 612 | 2 | 1 | 3 | 2 | 2 | 0 | 4 | 4 |
| SUB-SECTION NODE 614 | 2 | 3 | 1 | 4 | 4 | 4 | 0 | 2 |
| SUB-SECTION NODE 616 | 2 | 3 | 1 | 4 | 4 | 4 | 2 | 0 |

SYSTEMS AND METHODS FOR GRAPH-BASED DYNAMIC INFORMATION RETRIEVAL AND SYNTHESIS

TECHNICAL FIELD

The present disclosure generally relates to the field of artificial intelligence (AI) and natural language processing (NLP), and more particularly to information retrieval and response generation in chatbot applications.

BACKGROUND

In AI-driven chatbot technologies, the ability to provide accurate, relevant, and contextually appropriate responses to user queries is of increasing importance. Traditional chatbots, particularly those employing large language models (LLMs), have made significant strides in automating customer service, healthcare, educational applications, and legal information retrieval. However, these systems are not without their limitations. A notable challenge faced by current implementations is the phenomenon known as "hallucination," where chatbots generate responses that are factually incorrect, speculative, or entirely fabricated. This issue not only undermines the reliability and trustworthiness of chatbots but may also impede their effective and responsible usage, especially in domains where accuracy is of particular importance, such as legal and healthcare information retrieval.

One approach used to mitigate the issue of hallucinations, known as retrieval augmented generation or RAG, employs dynamic retrieval of query related information to provide context for an LLM, grounding the LLM's response in relevant knowledge. However, several limitations of RAG exist. In one example, the reliance of conventional RAG systems on semantic similarity to determine which documents are relevant to a user query may result in superficially relevant information being provided to an LLM, which is in fact not related to the user query. As an example, if a user query asks about a 1977 Mustang (a vehicle), documents referencing Kiger mustangs (an animal), which were discovered in 1977, may be identified as relevant to the user query, leading to potentially confusing or irrelevant response from the LLM. A second, related issue with conventional RAG systems occurs when relevant information is not included in the context provided by an RAG system to an LLM, because the contextually relevant information is superficially dissimilar to the user query. As an example, if a user query asks about the price of apartments in New York, a document consisting only of apartment unit numbers and prices, which contains the information desired by the user, may not be selected for inclusion with the documents provided to the LLM, because said document does not include specific mention of the city of New York, or the word apartment.

In light of the limitations of existing RAG approaches, there is a need for a more robust framework for providing context to LLMs as part of satisfying a user query. In particular, an approach which mitigates the brittleness of existing semantic similarity based document selection, and which leverages hierarchical relationships between documents to provide more contextually rich and coherent information to an LLM, is generally desired.

SUMMARY

The current disclosure at least partially addresses the existing limitations of RAG. In one embodiment, a method is provided for information retrieval in response to a user query. The method includes receiving a user query and generating a query embedding for the user query using a trained embedding model. The method further involves accessing a knowledge graph stored in a graph database. This knowledge graph comprises a plurality of nodes representing documents, with each node being associated with a document embedding from a plurality of document embeddings. These document embeddings characterize the content of the documents corresponding to the nodes. The method proceeds by retrieving a set of N documents, where N is a positive integer greater than one, based on a similarity score between the query embedding and the plurality of document embeddings of the nodes in the knowledge graph. A distance matrix is constructed by calculating a plurality of shortest-path distances between each pair of nodes corresponding to the set of N documents. The N documents are then clustered based on the distance matrix to identify a largest cluster of nodes. Content is retrieved from the largest cluster of nodes, and a response to the user query is formulated based on the retrieved content. The response is prepared for display on a user interface.

In another embodiment, a method is disclosed that includes receiving a user query and generating a query embedding for the user query using a trained embedding model. The method accesses a vector database, wherein the vector database stores a plurality of document embeddings. Each document embedding characterizes the content of a document and is uniquely associated with a corresponding node in a knowledge graph stored in a graph database. The knowledge graph includes a plurality of nodes representing documents. The method retrieves a set of N similar documents based on a similarity score between the query embedding and the plurality of document embeddings stored in the graph database. An N×N distance matrix is constructed by calculating a plurality of shortest-path distances between each pair of nodes corresponding to the set of N similar documents in the knowledge graph. The N similar documents are clustered based on the N×N distance matrix to identify a largest cluster of nodes. Content is retrieved from the largest cluster of nodes, and a response to the user query is formulated based on the retrieved content. The response is prepared for display on a user interface.

In yet another embodiment, a system is provided for information retrieval in response to a user query. The system comprises a memory storing instructions and a trained embedding model stored in the memory. A vector database is communicably coupled to the memory, wherein the vector database stores a plurality of document embeddings. Each document embedding characterizes the content of a document and is uniquely associated with a corresponding node in a knowledge graph stored in a graph database. The knowledge graph includes a plurality of nodes representing documents. A processor is communicably coupled to the memory and the vector database. When executing the instructions, the processor is configured to receive a user query and generate a query embedding for the user query using the trained embedding model. The processor accesses the vector database to retrieve a set of N similar documents based on a similarity score between the query embedding and the plurality of document embeddings stored in the vector database. The processor constructs an N×N distance matrix by calculating a plurality of shortest-path distances between each pair of nodes corresponding to the set of N similar documents in the knowledge graph. The processor clusters the N similar documents based on the N×N distance matrix to identify a largest cluster of nodes and retrieves content from the largest cluster of nodes. A user interface is communicably coupled to the processor and is configured to display a response to the user query based on the retrieved content.

The disclosed embodiments offer an improvement over conventional RAG approaches by utilizing a knowledge graph to provide a more complete and contextually coherent set of documents to inform the responses of large language models (LLMs). Clustering of the nodes of the knowledge graph based on the calculated distance matrix ensures that the context provided to the LLM is derived from documents that are not only individually relevant but also share a strong contextual relationship with one another. This method effectively filters out anomalies and outliers that may be contextually distant, despite a high semantic similarity score. By focusing on the largest cluster of nodes, the system prioritizes content that is thematically consistent and interrelated, which significantly enhances the richness of the context. This graph-interconnectedness based clustering mechanism at least partially mitigates the brittleness of existing semantic similarity based document selection, enabling LLM responses that are grounded in a more accurate and contextually rich subset of information.

BRIEF DESCRIPTION OF THE DRAWINGS

Various aspects of the present disclosure may be better understood upon reading the following detailed description and upon reference to the drawings in which:

FIG. 7 is a diagram illustrating a distance matrix for the nodes shown in FIG. 6.

DETAILED DESCRIPTION

The present disclosure is directed to systems and methods for enhancing the accuracy and reliability of chatbot responses in the context of information retrieval and response generation. The approaches taught herein address the challenge of "hallucination" in large language models (LLMs), where chatbots may generate responses that are factually incorrect, speculative, or entirely fabricated. To mitigate the issue of hallucination, the disclosed systems and methods leverage a graph database to create a knowledge graph that represents a hierarchical and interconnected structure of documents. This knowledge graph is utilized in conjunction with a trained embedding model to generate document embeddings that characterize the content of the documents. By using both the semantic relevance and the interconnectedness of documents within the knowledge graph to dynamically retrieve information relevant to a user query/prompt, the disclosed approaches enable grounding of LLM responses in more contextually coherent information sources.

The disclosed methods involve receiving a user query and generating a query embedding using the trained embedding model. A set of documents is retrieved based on a similarity score between the query embedding and the document embeddings of nodes in the knowledge graph. A distance matrix is constructed by calculating shortest-path distances between each pair of nodes corresponding to the retrieved documents. The documents are then clustered based on the distance matrix to identify the largest cluster of nodes, from which content is retrieved to formulate a response to the user query. This approach addresses the limitations of conventional retrieval augmented generation (RAG) systems by reducing the likelihood of selecting documents that are only superficially related to the user query. It also increases the probability of including information that, while superficially dissimilar to the user query, is contextually relevant and necessary for satisfying the user query. By focusing on the largest cluster of nodes, the system ensures that the context provided to the LLM is derived from documents that are not only individually relevant but also share a strong contextual relationship with one another.

The disclosed systems and methods represent a significant advancement over existing RAG approaches by utilizing a knowledge graph to provide a more complete and contextually coherent set of documents to inform the responses of LLMs. This graph-interconnectedness based clustering mechanism mitigates the brittleness of existing semantic similarity-based document selection, enabling LLM responses that are grounded in a more accurate and contextually rich subset of information. As a result, the disclosed invention enables improved information retrieval that is particularly beneficial in domains where the accuracy and reliability of chatbot responses are particularly desired.

Figure 1:
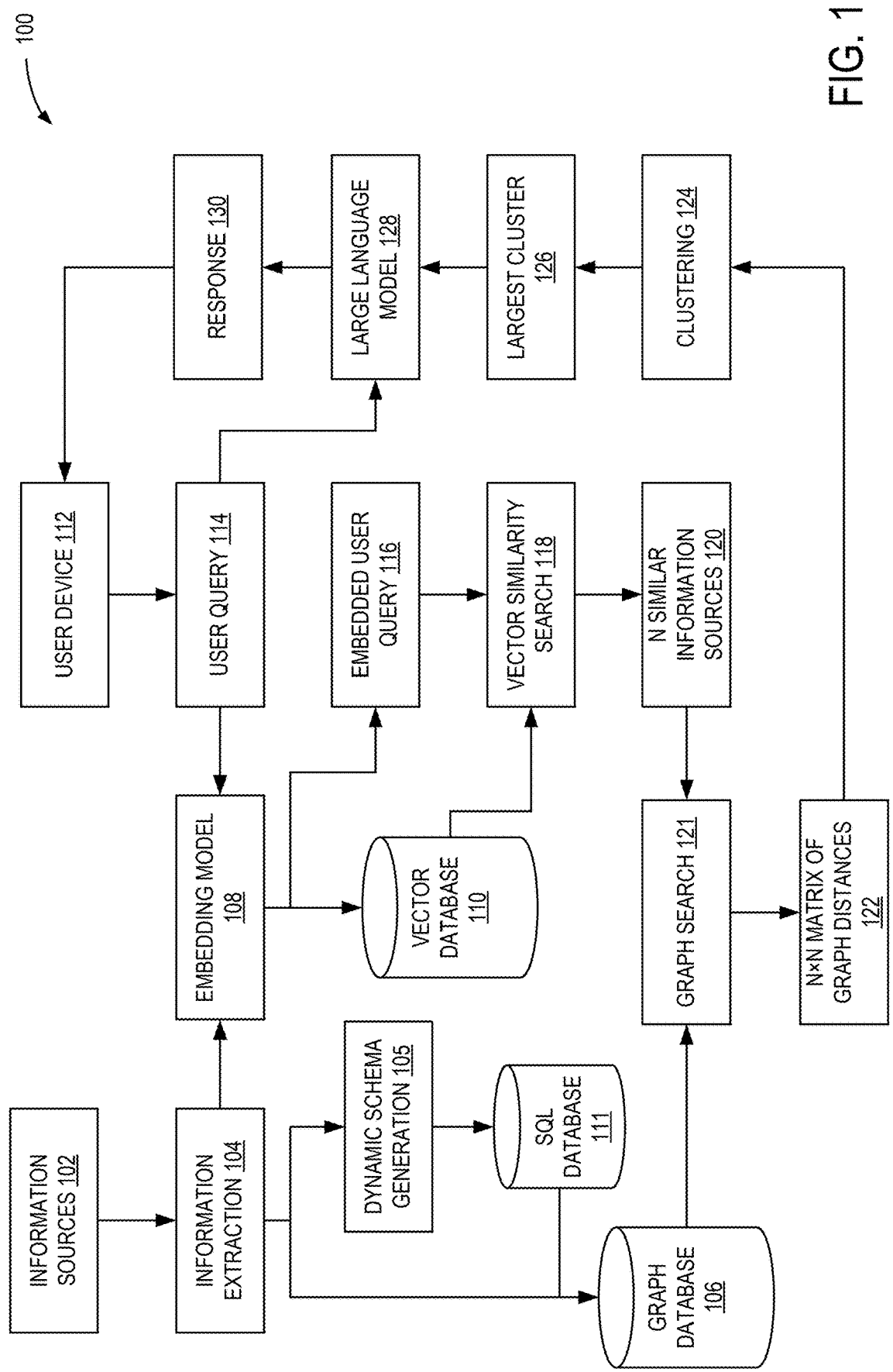
FIG. 1 is a schematic diagram illustrating a system for information retrieval and response generation using a large language model.

In one embodiment, a process 100 for information retrieval and response generation using a large language model is depicted in FIG. 1. The process 100 is configured to enhance the capabilities of chatbot applications by providing accurate and contextually relevant responses to user queries. The process 100 architecture is further detailed in FIG. 2, which illustrates a graph-based retrieval augmented text generation device 202 that leverages a knowledge graph to improve the contextual coherence of information provided to the large language model.

Figure 3:
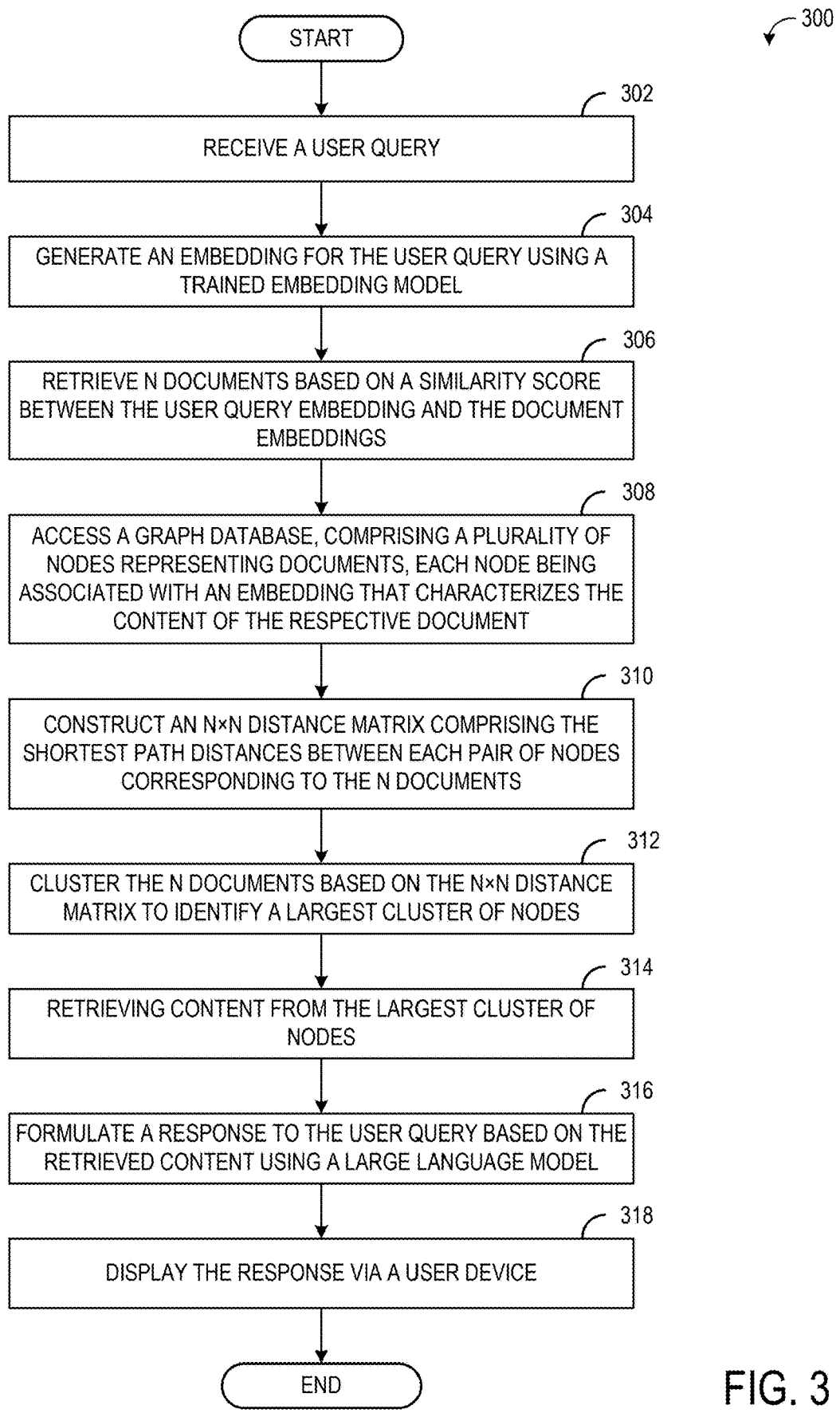
FIG. 3 is a flowchart illustrating a method for processing a user query, retrieving relevant information from a graph database, and generating a response using a large language model.
Figure 4:
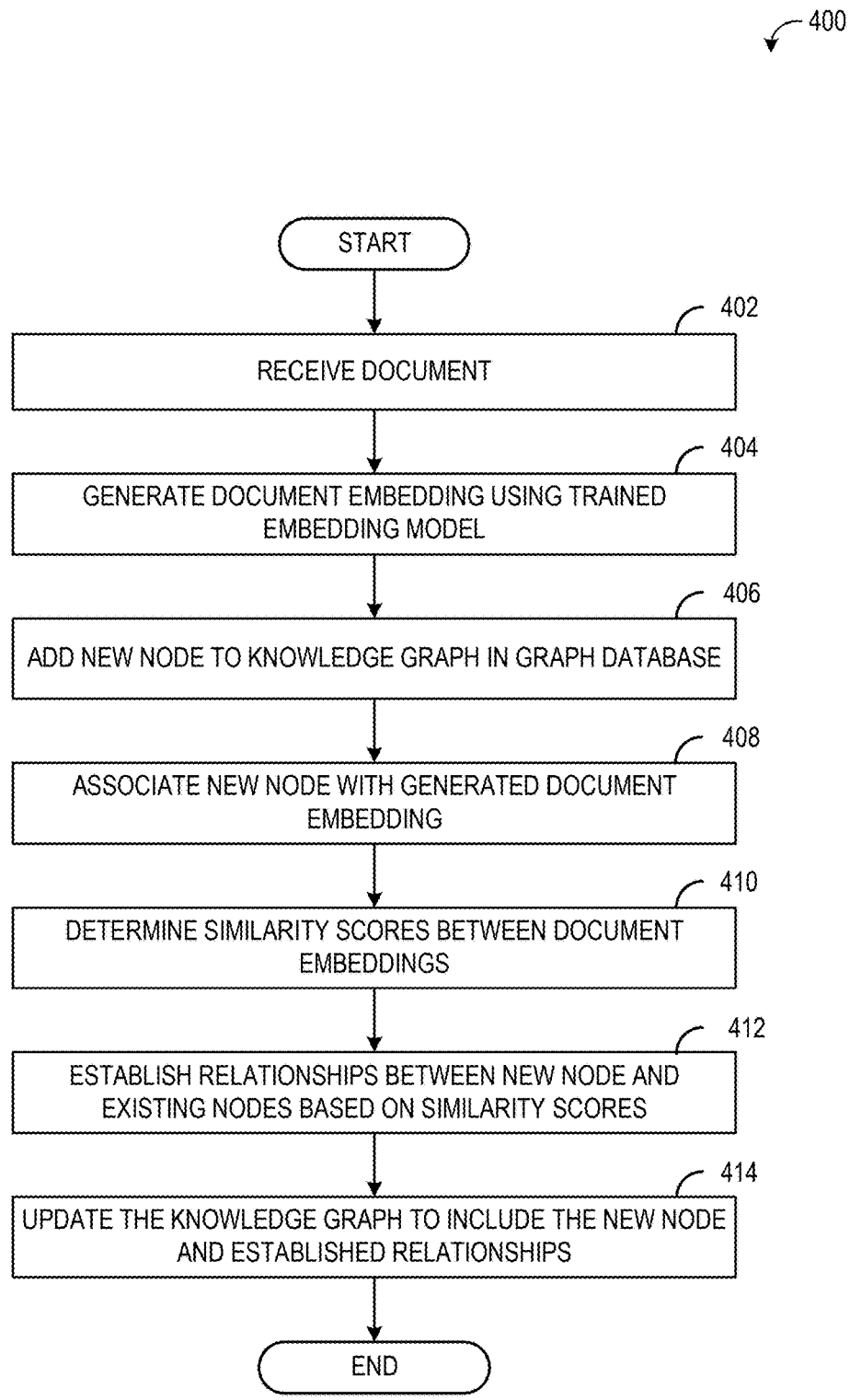
FIG. 4 is a flowchart illustrating a method for integrating a new document into a knowledge graph within a graph database, including generating a document embedding and establishing relationships with existing nodes.
Figure 5:
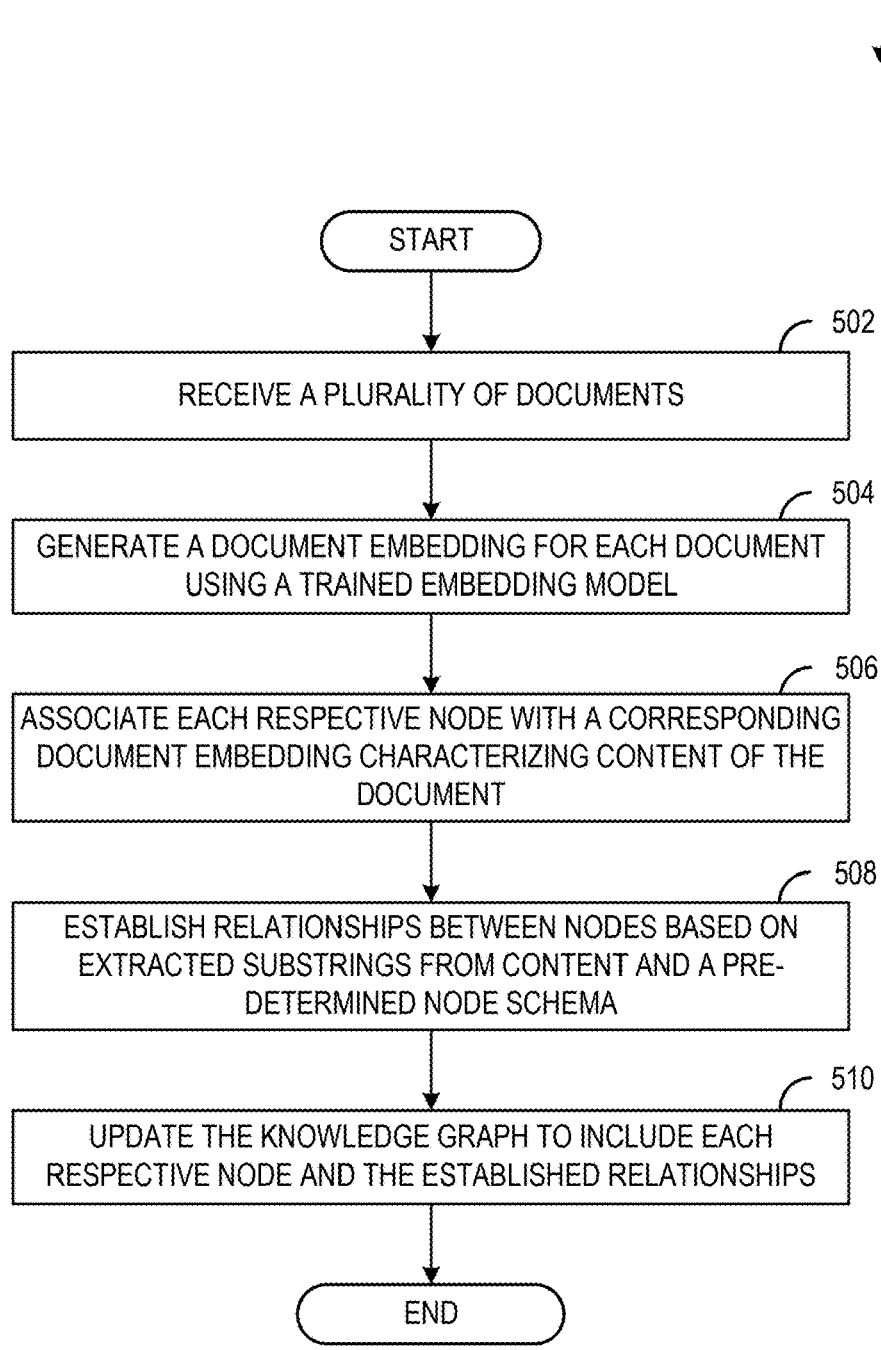
FIG. 5 is a flowchart illustrating a method for updating a knowledge graph with a plurality of documents, establishing node relationships based on extracted substrings and a pre-determined node schema.

Process 100 may be utilized to respond to a user query, as outlined in FIG. 3, which presents a flowchart illustrating a method 300 for retrieving information relevant to a user query. Method 300 includes retrieving relevant information from a graph database by clustering knowledge graph nodes based on a distance matrix and generating a response using a large language model, ensuring that the responses are grounded in accurate and contextually coherent information. FIG. 4 provides a flowchart that details a method 400 for integrating a new document into the knowledge graph within the graph database. Method 400 involves generating a document embedding and establishing relationships with existing nodes to maintain the integrity and interconnectedness of the knowledge graph. Similarly, FIG. 5 depicts a flowchart illustrating a method 500 for updating the knowledge graph with a plurality of documents. Method 500 establishes node relationships based on extracted substrings and a pre-determined node schema, allowing for the knowledge graph to dynamically update based on newly available information.

Figure 6:
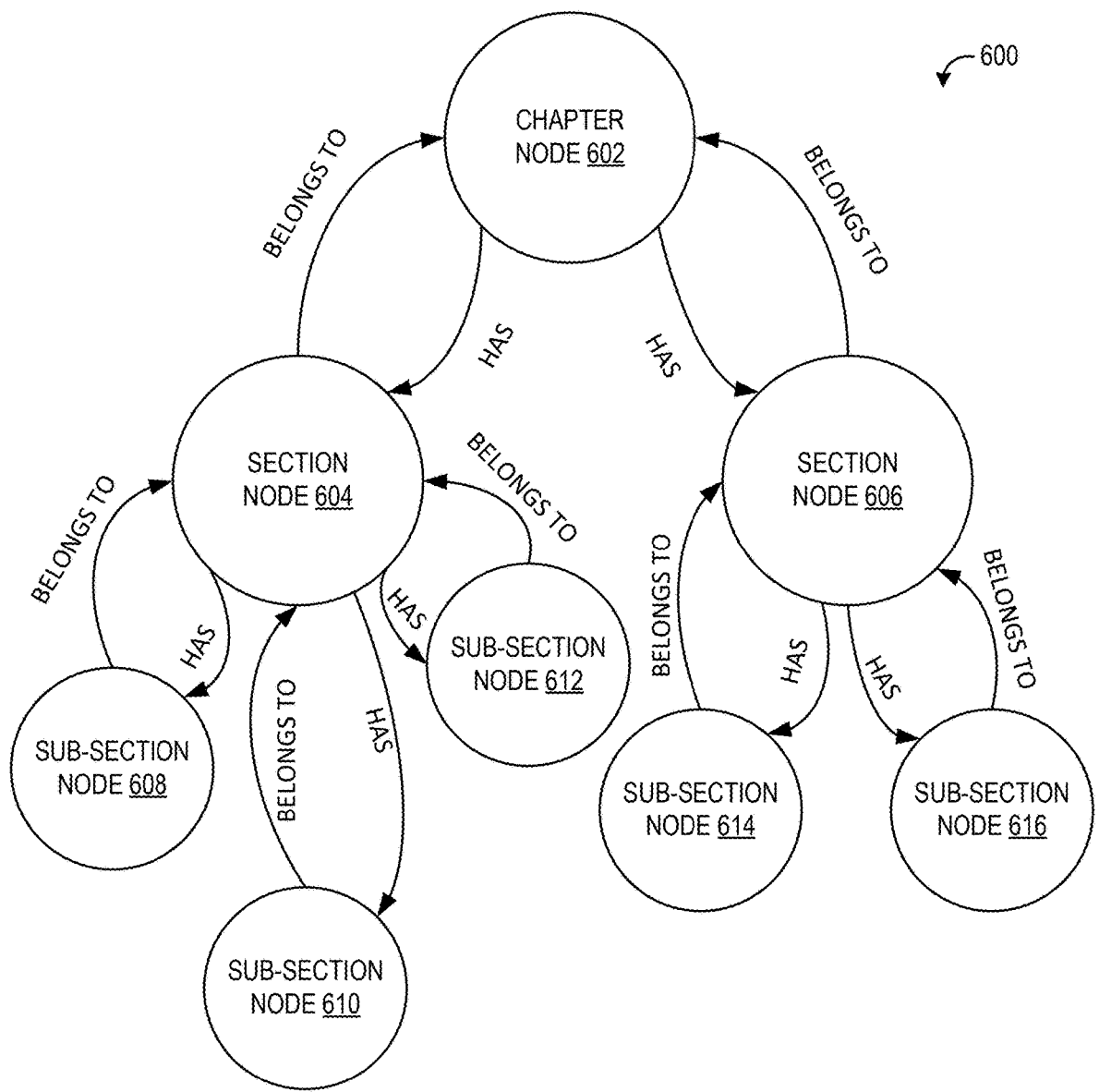
FIG. 6 is a schematic diagram illustrating the hierarchical structure of nodes within a knowledge graph, including chapter nodes, section nodes, and sub-section nodes.

One embodiment of a knowledge graph 600 is shown in FIG. 6, which includes chapter nodes, section nodes, and sub-section nodes, demonstrating the structured and hierarchical approach to information storage and retrieval disclosed herein. FIG. 7 shows a diagram illustrating a distance matrix 700 for the nodes shown in knowledge graph 600. The distance matrix 700 enables clustering of nodes in the knowledge graph 600 based on the shortest-path distances between each pair of nodes, enabling dynamic determination of a largest cluster of nodes, most related to a current user query.

Examples will be provided below for illustration. The descriptions of the various examples will be presented for purposes of illustration, but are not intended to be exhaustive or limited to the embodiments. Many modifications and variations will be apparent to those of ordinary skill in the art without departing from the scope and spirit of the described embodiments.

Referring to FIG. 1, a block diagram of a graph-based information retrieval and response generation process 100 is depicted. illustrating an embodiment of a system for providing accurate and contextually relevant responses to user queries. The process 100 is particularly advantageous in applications such as chatbot technologies, where dynamic information retrieval of information sources based on user queries may be employed to ground chatbot responses in a corpus of factual information sources.

The information sources 102 represent the raw data from which the system extracts information. In one embodiment, the information sources 102 may include a variety of documents such as legal statutes, case summaries, educational materials, or customer service records. These documents may be in various formats, including text files, images, or PDFs, and may be obtained through web scraping scripts or other data sourcing techniques. The information sources 102 are fed to the information extraction 104 process, which begins the process of transforming the raw data of the information sources 102 into a structured and queryable format. The information sources may be initially extracted and processed, and then periodically updated according to a pre-determined schedule, to account for changes to one or more of information sources 102 (e.g., updating of a web page, law, instruction manual, etc.).

Information extraction 104 processes the information sources 102 to extract relevant data. In one embodiment, information extraction 104 may involve the use of natural language processing (NLP) techniques to parse and understand the content of the documents. This may include identifying key entities (i.e., substrings), relationships, and concepts within the text. In another embodiment, information extraction 104 may utilize optical character recognition (OCR) technologies to convert scanned documents or images containing text into machine-readable text. The extracted information is then stored in the graph database 106, which maintains a structured knowledge graph representing the information sources 102 and relationships between information sources 102.

After information extraction 104, dynamic schema generation 105 is conducted to generate a dynamic schema that determines the structure and data types of the extracted data, which is then stored in a SQL database 111. Dynamic schema generation 105 analyzes the extracted data to identify its structure and relationships, employing natural language processing techniques, such as named entity recognition and relationship extraction, to identify key entities, concepts, and their interconnections. Additionally, machine learning algorithms may be utilized to detect patterns and infer data types, such as numerical, categorical, or textual. In some embodiments, a large language model may be employed at schema generation 105 to reformat the extracted data by providing one or more examples to the large language model of target schema's for previously extracted data.

Upon generation, the schema is presented to a user for verification and approval, allowing domain experts or subject matter specialists to review and adjust the schema as necessary. Following user approval, the extracted data is structured according to the dynamic schema and stored in SQL database 111, serving as an intermediate storage that facilitates data management and additional processing. This structured data is subsequently pushed to graph database 106 for integration into the knowledge graph, where it is mapped to appropriate nodes and relationships, ensuring accurate representation of the information's hierarchical and interconnected nature.

The graph database 106 stores the extracted information from information sources 102, as a knowledge graph that represents a hierarchical and interconnected structure of documents. The knowledge graph within the graph database 106 includes nodes representing documents and edges representing relationships between these documents. In another embodiment, the graph database 106 may be configured to support complex queries and transactions, enabling the system to quickly access and manipulate the knowledge graph in response to user queries.

The embedding model 108 may convert both the extracted information and the user query into embeddings in a high-dimensional vector space. In one embodiment, the embedding model 108 may be a neural network-based model trained to generate embeddings that capture the semantic meaning of the documents and queries. These embeddings serve as a numerical representation of the content, facilitating the comparison and retrieval of semantically similar documents.

The vector database 110 is communicably coupled to the embedding model 108 and stores the embeddings generated from the extracted information. In one embodiment, the vector database 110 may be configured to store vector embeddings for large language model applications and may support rapid vector similarity search functions, such as approximate nearest neighbors. Each document embedding stored in vector database 110 characterizes the content of a particular document and is uniquely associated with a corresponding node in the knowledge graph stored in the graph database 106. In another embodiment, the vector database 110 may support efficient similarity searches, enabling the system to quickly identify documents with embeddings similar to that of the user query.

The user device 112 interfaces with the system, allowing users to submit queries and receive responses. The user device 112 may be a computer, smartphone, tablet, or any other device capable of communicating with the system. The user query 114 is input by the user through the user device 112 and represents the information or assistance the user is seeking.

The embedded user query 116 is the result of the embedding model 108 processing the user query 114. The embedding model 108 generates an embedding for the user query, converting it into a vector representation that can be compared with the document embeddings stored in the vector database 110.

The vector similarity search 118 compares the similarity of the embedded user query 116 with the embeddings stored in the vector database 110. In one embodiment, the vector similarity search 118 may employ cosine similarity measures to determine the closeness between the query embedding and the document embeddings. The N similar information sources 120 represent the set of documents, corresponding to the N embedding vectors stored in the vector database 110, which are most similar to the embedded user query 116. N, as used herein, is a positive integer larger than 1. In some embodiments, the value N may be determined dynamically, e.g., by retrieving all documents with a similarity score (e.g., cosine similarity) greater than a predetermined similarity score threshold.

The graph search 121 utilizes the set of N similar documents 120 retrieved by the vector similarity search 118 to generate the N×N matrix of graph distances 122. This is accomplished by constructing a Cypher query to retrieve the nodes in the knowledge graph corresponding to the N similar documents 120. The Cypher query then calculates the shortest path distance between each pair of these nodes using a pathfinding algorithm like Dijkstra's algorithm. These pairwise shortest path distances between the N nodes make up the entries of the N×N distance matrix 122. By leveraging the graph structure and interconnectedness of the knowledge graph, the graph search 121 captures the contextual relatedness between the N similar documents beyond just their semantic similarity to the query embedding. Documents that are more closely connected within the knowledge graph structure will have shorter path distances in the N×N matrix, indicating a stronger contextual relationship.

The N×N matrix of graph distances 122 encodes the contextual relationships between the content of the N similar documents 120 based on their interconnectedness within the knowledge graph. Each entry in the symmetrical N×N matrix represents the shortest path distance between a pair of nodes corresponding to two of the N documents. These pairwise distances quantify how closely related the subject matter of the documents are within the broader context of the knowledge graph. Documents covering very similar content will have nodes that are tightly connected by short path lengths in the graph, resulting in small distance values in the matrix. Conversely, documents with more divergent content will be separated by longer path distances, represented by larger values in the corresponding matrix entries. The N×N structure allows all pairwise relationships between the N documents to be compactly encoded, highlighting clusters of closely related content. This matrix therefore captures the contextual coherence between the documents beyond just their semantic similarity to the query embedding alone.

The N×N matrix of graph distances 122 is used in clustering 124, which groups the N similar information sources 120 based on their proximity/relatedness in N-dimensional space. Each row (or column, as the N×N matrix is square and symmetrical) of the N×N matrix of graph distances 122 can be thought of as a vector, where each dimension of the vector gives the degree of "relatedness" between two of the N similar information sources 120. In one embodiment, clustering 124 may employ a k-means clustering algorithm to partition the documents into clusters.

The largest cluster 126 is identified from the clusters produced by clustering 124, as the cluster containing the largest portion of the N similar information sources 120. This cluster represents the most contextually coherent subset of the N similar information sources 120, and will be used to provide context to the user query 114 in downstream operations, to ground the response of the large language model 128 in factual and relevant information.

The large language model 128 is configured to generate responses to user queries based on the context provided by the content retrieved from the largest cluster 126. In one embodiment, the large language model 128 may be an AI model comprising more than one billion parameters, and configured to understand and generating natural language text.

The response 130 is the output generated by the large language model 128 and is transmitted to the user device 112. The response 130 is presented in a user-friendly format, such as within a chat interface or as spoken language through a text-to-speech system. In one embodiment, the system provides the response in real-time as part of an interactive chat session. In another embodiment, the system may store the response for later retrieval or analysis.

The graph-based information retrieval and response generation process 100, as described herein, enables the efficient and accurate processing of user queries to produce contextually relevant and factually grounded responses. By leveraging a combination of embedding models, graph databases, vector databases, and clustering techniques, the system provides an improvement over conventional chatbot technologies, particularly in reducing the occurrence of hallucinations and enhancing the trustworthiness of chatbot responses.

Figure 2:
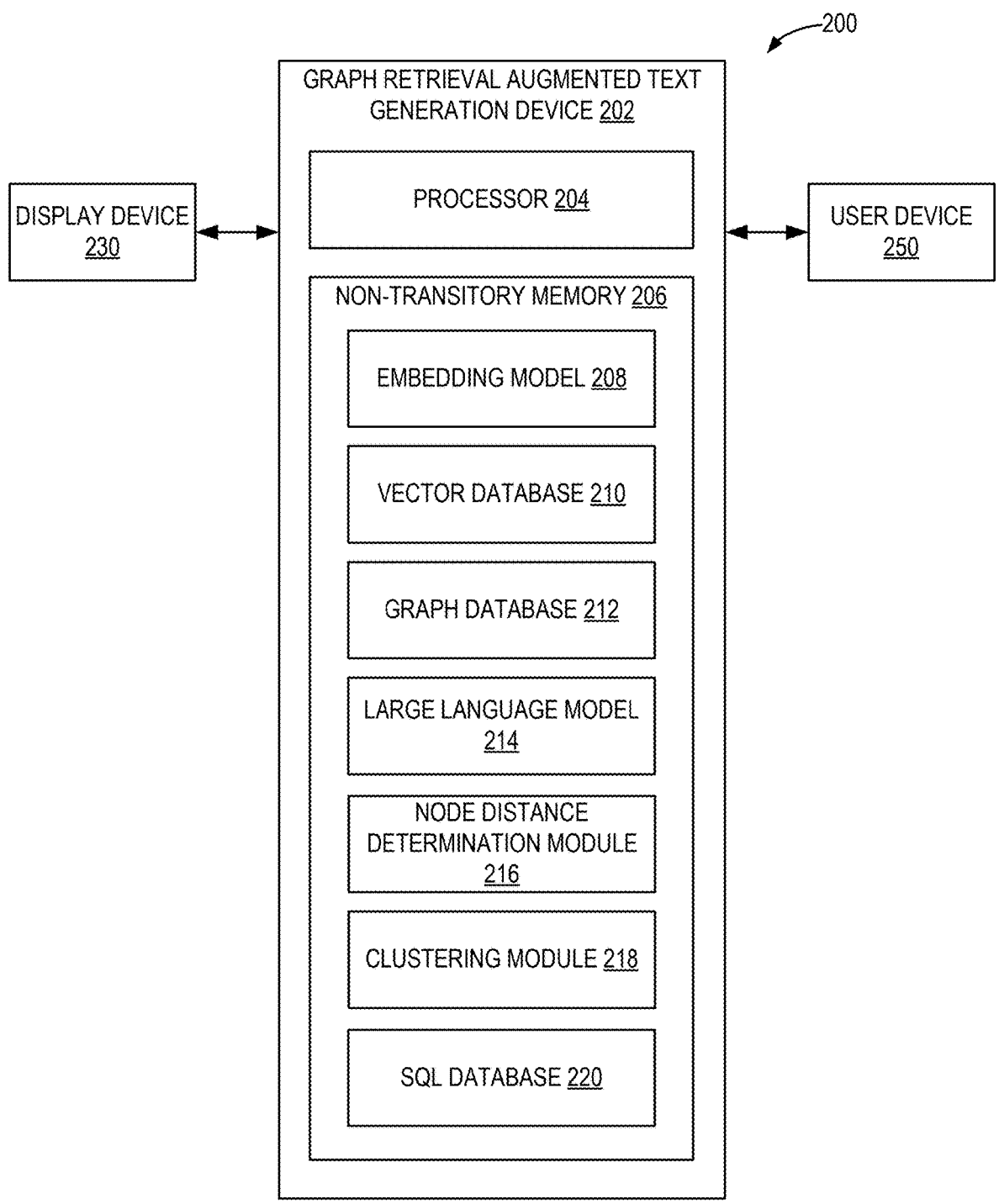
FIG. 2 is a block diagram illustrating a graph based retrieval augmented text generation device.

Referring to FIG. 2, a graph retrieval augmented text generation system 200 is shown, in accordance with an exemplary embodiment. The system 200 is configured to enhance the capabilities of chatbot applications by leveraging a knowledge graph to provide accurate, relevant, and contextually appropriate responses to user queries. The system 200 includes a graph retrieval augmented text generation device 202, which is designed to interact with a user device 250 and display responses via a display device 230.

The graph retrieval augmented text generation device 202 comprises a processor 204, which is configured to execute machine-readable instructions stored in a non-transitory memory 206. The processor 204 may be a single-core or multi-core processor, and the programs executed thereon may be configured for parallel or distributed processing. In some embodiments, the processor 204 may include individual components that are distributed throughout two or more devices, which may be remotely located and/or configured for coordinated processing. In other embodiments, aspects of the processor 204 may be virtualized and executed by remotely-accessible networked computing devices configured in a cloud computing configuration.

The display device 230 is communicably coupled to the processor 204 and is configured to display a response to a user query based on content retrieved from the largest cluster of nodes within a knowledge graph. The display device 230 may include one or more display devices utilizing virtually any type of technology, such as a computer monitor, a touchscreen, or a projector. In some embodiments, the display device 230 may be combined with the processor 204 and non-transitory memory 206 in a shared enclosure, or it may be a peripheral display device.

The non-transitory memory 206 stores machine-readable instructions that, when executed by the processor 204, enable the device 202 to perform various functions related to information retrieval and response generation. Within the non-transitory memory 206, an embedding model 208 is stored. The embedding model 208 is trained to generate query embeddings for user queries and document embeddings for documents within a knowledge graph. In one embodiment, the embedding model 208 may utilize an API to generate embeddings that characterize the content of documents and queries.

Also stored within the non-transitory memory 206 is a vector database 210. The vector database 210 stores a plurality of document embeddings, each uniquely associated with a corresponding node in a knowledge graph stored in a graph database 212. The document embeddings characterize the content of documents and facilitate the retrieval of similar documents based on a similarity score between the query embedding and the document embeddings.

The graph database 212, which is communicably coupled to the processor 204, includes a plurality of nodes representing documents. The graph database 212 is configured to store and manage the knowledge graph, which comprises nodes and edges representing documents and their interrelationships, respectively. The knowledge graph enables the system 200 to understand the hierarchical and contextual relationships between different pieces of information.

A large language model 214 is also stored within the non-transitory memory 206. The large language model 214 is configured to generate responses to user queries based on the context provided by the content retrieved from the knowledge graph. In some embodiments, the large language model 214 may be an advanced AI model capable of understanding and generating human-like text.

The node distance determination module 216 is stored within the non-transitory memory 206 configured to calculate the shortest-path distances between pairs of nodes representing documents within the knowledge graph. In one embodiment, the node distance determination module 216 may utilize Dijkstra's algorithm to determine the shortest-path distances, which are indicative of the degree of relatedness between the content of the documents corresponding to the nodes.

A clustering module 218 is also included within the non-transitory memory 206. The clustering module 218 is configured to cluster documents based on the distance matrix generated by the node distance determination module 216 to identify the largest cluster of nodes. In one embodiment, the clustering module 218 may employ a k-means clustering algorithm to partition the documents into clusters within an N-dimensional space, where the largest cluster is determined by the cluster having the greatest number of nodes from the set of similar documents.

The user device 250 is configured to interface with the graph retrieval augmented text generation device 202. The user device 250 may be a computer, a smartphone, a tablet, or any other device capable of submitting queries to the system 200 and receiving responses. The user device 250 may include a user interface that allows users to interact with the system 200, input queries, and view the responses generated by the large language model 214 based on the content retrieved from the knowledge graph.

In alternative embodiments, the components of the graph retrieval augmented text generation device 202 may include additional modules or features to enhance the system's capabilities. For example, the system 200 may incorporate a feedback mechanism that allows the system to learn from user interactions and improve the accuracy of its responses over time. Additionally, the system 200 may be adapted to support multiple languages and dialects, making it accessible to a broader range of users.

By leveraging the hierarchical relationships of a knowledge graph and node interconnectedness, the system 200 provides contextually coherent information and mitigates the inclusion of information from irrelevant or superficially related documents in the responses generated by the large language model 214.

Referring to FIG. 3, a method 300 for processing and responding to a user query using a combination of embedding models, graph databases, and clustering techniques is illustrated. The method 300 may be employed by a system configured to enhance the accuracy and relevance of responses provided by chatbot applications, particularly in domains where factual correctness is paramount.

At operation 302, the system receives a user query. The user query may be input by a user through a user interface communicably coupled to the system. The user query may be in the form of natural language text and may pertain to a wide range of topics, including but not limited to legal information, healthcare inquiries, customer service requests, or educational content. In one embodiment, the user query is received via a web-based chat interface, while in another embodiment, the user query may be received through a voice recognition system that converts spoken language into text.

At operation 304, the system generates an embedding for the user query using a trained embedding model. The embedding model may be a neural network-based model trained to convert text into a high-dimensional vector space, where semantically similar phrases are mapped to proximate points. The embedding model may be an instance of the OpenAI's text-embedding-ada-002 model or any other suitable model capable of generating embeddings that capture the semantic nuances of the user query. In one embodiment, the embedding model is accessed via an API, such as the Azure OpenAI API, using an API key. In another embodiment, the embedding model may be hosted locally within the system's infrastructure.

At operation 306, the system retrieves N documents based on a similarity score between the user query embedding and the document embeddings. The similarity score may be determined using cosine similarity measures or other appropriate metrics that quantify the closeness between the query embedding and embeddings of documents stored within a vector database, such as ChromaDB. The value of N is a positive integer greater than one, and the set of N documents represents the most semantically relevant documents to the user query. In one embodiment, the system retrieves the top N documents with the highest similarity scores. In another embodiment, the system may apply additional filters or thresholds to refine the selection of documents based on the context or domain of the user query.

At operation 308, the system accesses a graph database, comprising a plurality of nodes representing documents, each node being associated with an embedding that characterizes the content of the respective document. The graph database, such as Neo4j, may be configured with a knowledge graph that includes nodes and edges representing documents and their interrelationships, respectively. Each node's embedding may have been previously generated using the same or a similar embedding model as used for the user query. In one embodiment, the system accesses the graph database using Cypher query language to retrieve nodes corresponding to the N documents. In another embodiment, the system may utilize a pre-configured API to interact with the graph database.

At operation 310, the system constructs an N×N distance matrix comprising the shortest path distances between each pair of nodes corresponding to the N documents. The shortest path distances may be calculated using Dijkstra's algorithm or another suitable pathfinding algorithm that operates within the graph database. The distance matrix reflects the degree of relatedness between the content of the documents, with shorter distances indicating stronger contextual relationships. In one embodiment, the system calculates the distance matrix in real-time in response to the user query. In another embodiment, the system may periodically pre-calculate and store distance matrices for clusters of documents within the knowledge graph to expedite the retrieval process.

At operation 312, the system clusters the N documents based on the N×N distance matrix to identify a largest cluster of nodes. The clustering may be performed using a k-means clustering algorithm or any other appropriate clustering technique that groups documents into clusters based on their distances in the N-dimensional space. The largest cluster of nodes is identified as the cluster containing the greatest number of closely related documents. In one embodiment, the system prioritizes content from the largest cluster based on thematic consistency and interconnectedness. In another embodiment, the system may consider additional factors such as the recency or authority of documents within the cluster.

At operation 314, the system retrieves content from the largest cluster of nodes. The content may include text, metadata, or any other information stored within the documents represented by the nodes in the largest cluster. In one embodiment, the system retrieves the full text of each document within the cluster. In another embodiment, the system may retrieve summaries or excerpts of the documents that are most relevant to the user query.

At operation 316, the system formulates a response to the user query based on the retrieved content using a LLM. The LLM may be configured to synthesize the retrieved content into a coherent and contextually appropriate response. The system may customize the prompt provided to the LLM to ensure that the response is grounded in the retrieved content. In one embodiment, the system uses a RetrievalQAWithSourcesChain to integrate the retrieved content with the user query to generate the response. In another embodiment, the system may employ additional processing steps, such as paraphrasing or summarization, to refine the response before presentation to the user.

At operation 318, the system displays the response via a user device. The user device may be a computer, smartphone, tablet, or any other device capable of displaying text. The response is presented in a user-friendly format, such as within a chat interface or as spoken language through a text-to-speech system. In one embodiment, the system provides the response in real-time as part of an interactive chat session. In another embodiment, the system may store the response for later retrieval or analysis.

In this way, method 300 enables the efficient and accurate processing of user queries to produce contextually relevant and factually correct responses. By leveraging a combination of embedding models, graph databases, and clustering techniques, the system provides an improvement over conventional chatbot technologies, particularly in reducing the occurrence of hallucinations and enhancing the trustworthiness of chatbot responses.

Referring to FIG. 4, a flowchart of a method 400 for integrating a document into a knowledge graph using document embeddings is shown. The method 400 enables integration of new information into pre-existing knowledge graphs, enabling responses from a chatbot application to remain current, even when the underlying LLM is trained on data which is not necessarily up to date. The method 400 utilizes document embeddings to establish semantic relationships between documents, thereby facilitating a more contextually coherent and accurate response generation by LLMs.

At operation 402, the method 400 begins with the receipt of a document. This document may be any form of digital text, such as a legislative code, case opinion, internet article or any other relevant document. The document is received by a processing system configured to handle and analyze textual data. In one embodiment, the document may be sourced from web scraping scripts which automate the collection of PDF files or html formatted text from specified URLs. The system may employ technologies such as Selenium and BeautifulSoup for web scraping purposes, ensuring that the most up-to-date and relevant documents are retrieved for integration into the knowledge graph.

Proceeding to operation 404, the method involves generating a document embedding for the received document using a trained embedding model. The document embedding is a vector representation of the document's content, capturing the semantic essence of the text within a high-dimensional space. In one embodiment, the embedding may be generated using an API, or via a trained embedding model stored locally. The generation of document embeddings allows for the comparison of documents based on their semantic content rather than just their textual similarity.

At operation 406, the method includes adding a new node to the knowledge graph in a graph database. The knowledge graph is a structured representation of knowledge, where nodes represent entities such as documents, and edges represent relationships between these entities. In one embodiment, operation 406 includes the system creating a node entry that includes the document embedding as well as any other relevant metadata associated with the document, such as its title, authorship, publication date, or any other descriptive attributes that may aid in the retrieval and analysis of the node's content.

Following the addition of the new node, operation 408 involves associating the new node with the generated document embedding. This association embeds the semantic understanding of the document's content into the knowledge graph, enabling the system to perform more nuanced information retrieval. In one embodiment, the document embedding is stored as a property of the node within the graph database, allowing for efficient retrieval and comparison with other nodes. In another embodiment, the node within the knowledge graph my be associated with an external entry in a vector database, enabling cross referencing between vectors stored in the vector database with nodes stored in the graph database.

At operation 410, similarity scores between the embedding of the current document and existing document embeddings are determined. This process involves calculating the cosine similarity between the embedding of the new document and the embeddings of existing documents within the knowledge graph.

At operation 412, the method includes establishing relationships between the new node and existing nodes based on the similarity scores. These relationships are indicative of the semantic relatedness between documents. In one embodiment, relationships such as "RELATED_TO" may be created if the similarity score exceeds a pre-determined threshold, signifying a strong semantic connection. This operation may also involve the use of clustering algorithms, such as k-means. In another embodiment, at operation 412, edges in the knowledge graph may be created to link the new node to the existing nodes in the knowledge graph with semantic similarity greater than a pre-determined threshold.

At operation 414, method 400 includes updating the knowledge graph to include the new node and the established relationships. This update integrates the new document into the knowledge graph, ensuring that the newly added information is available for future information retrieval tasks. In one embodiment, the knowledge graph is updated in real-time, allowing for immediate improvements in the chatbot's response capabilities.

In an alternative embodiment, the method 400 may also include pre-processing steps prior to operation 402, such as OCR (Optical Character Recognition) using Tesseract, to convert scanned documents or images containing text into machine-readable text. This pre-processing ensures that the document is in a suitable format for embedding generation and subsequent integration into the knowledge graph.

Referring to FIG. 5, a flowchart of a method 500 for updating a knowledge graph with information extracted from a plurality of documents is shown. The method 500 enables creation of a knowledge graph from a plurality of information sources, or integration of new information into pre-existing knowledge graphs, enabling responses from a chatbot application to be grounded in current information sources, even when the underlying LLM is trained on data which is not necessarily up to date.

At operation 502, the method 500 begins with receiving a plurality of documents. In one embodiment, the documents may be sourced from various repositories, such as legal databases, medical records, or educational materials. For example, the documents could include PDF files of California Legislative Codes or case opinion summaries from California Legislation. The documents may be received in various formats, including text files, images, or PDFs, and may be obtained through web scraping scripts or other data sourcing techniques. In an alternative embodiment, the documents may be received from a user or an automated system that collects and forwards documents relevant to a particular domain, such as legal or healthcare information.

At operation 504, the method 500 proceeds to generate a document embedding for each document using a trained embedding model. In one embodiment, the embedding model may be an AI model trained to convert textual content into vector representations that capture the semantic meaning of the documents. The document embeddings serve as a numerical representation of the content, facilitating the comparison and retrieval of semantically similar documents. In another embodiment, the embeddings may be generated using a proprietary or open-source vector database, such as ChromaDB, which is designed to store vector embeddings for large language model applications.

At operation 506, each respective node in the knowledge graph is associated with a corresponding document embedding that characterizes the content of the document. In one embodiment, the nodes may represent various legal statutes, case summaries, or educational topics, and the associated embeddings enable the chatbot system to understand and retrieve information based on the content of the nodes. For example, a node representing a section of the Penal Code would be associated with an embedding that characterizes the legal content of that section. In an alternative embodiment, the nodes may also include metadata, such as document titles, authors, or publication dates, which can be used to provide additional context to the chatbot system.

At operation 508, relationships between nodes are established based on extracted substrings from the content and a pre-determined node schema. In one embodiment, the process of establishing relationships begins with the extraction of substrings from the content of documents. This extraction is performed using text analysis techniques, which may include regular expressions, natural language processing algorithms, or machine learning models trained to recognize and extract relevant patterns and terms from the text. The extracted substrings serve as indicators of the content's subject matter and are used to determine the relationships between nodes. Once the substrings are extracted, the system utilizes a pre-determined node schema to guide the establishment of relationships. The node schema defines the types of nodes within the knowledge graph and the permissible relationships between them. For example, the schema may specify that a 'Statute' node can have a 'HAS' relationship with 'Section' nodes, indicating that the statute comprises various sections. Similarly, a 'Case' node may have a 'SUMMARIZED_BY' relationship with a 'Summary' node, linking the case to its summary. To implement these relationships, the system may employ a graph query language, such as Cypher, to execute queries against the graph database. For instance, a Cypher query may be constructed to match an 'Article' node and then create a 'HAS' relationship to one or more 'Section' nodes that belong to that article. The query would use the extracted substrings to match the correct nodes and establish the appropriate relationships.

In another embodiment, at operation 508 the system proceeds to establish relationships between the new node and existing nodes within the knowledge graph. This is achieved by extracting one or more substrings from the content of the received document, which are indicative of specific topics, concepts, or entities. The system then identifies corresponding nodes in the knowledge graph that satisfy a pre-determined relationship type based on the extracted substrings. For instance, if the extracted substring corresponds to a particular statutory code, the system identifies the 'Statutory Code' node within the knowledge graph. Once the corresponding nodes are identified, the system creates edges in the knowledge graph that link the new node to the identified corresponding nodes with the pre-determined relationship type, such as 'REFERENCES' or 'CITED_BY'. This process not only enriches the knowledge graph with new content but also enhances the graph's navigability and searchability by establishing meaningful and contextually relevant connections between nodes.

At operation 510, the knowledge graph is updated to include each respective node and the established relationships. In one embodiment, the update process may involve adding new nodes and edges to the graph database, such as Neo4j, and ensuring that the graph structure reflects the latest information. The update may also include recalculating embeddings for existing nodes if the content has been modified or new information has been added. In an alternative embodiment, the update process may be performed incrementally, where only the changes are applied to the knowledge graph, thereby improving the performance and scalability of the system.

In another embodiment, the system may leverage graph algorithms to identify thematic or conceptual connections between documents. These algorithms analyze the content and structure of the knowledge graph to detect patterns that signify a deeper, more conceptual linkage between nodes. For example, a graph algorithm might identify that certain 'Case' nodes frequently reference the same 'Statute' nodes, suggesting a thematic relationship that can be represented in the knowledge graph.

Referring now to FIG. 6, a schematic diagram of an exemplary knowledge graph 600 is depicted, illustrating a structured and hierarchical approach to information storage and retrieval within a system for dynamic information retrieval and synthesis. The knowledge graph 600 is a representation of a graph database that includes a plurality of interconnected nodes, each node representing a document or a portion thereof, such as a chapter, section, or sub-section of a legal code, educational material, or any other domain-specific repository of information.

At the apex of the knowledge graph 600 is the chapter node 602, which serves as a parent node to a plurality of section nodes. In one embodiment, the chapter node 602 may represent a comprehensive topic or a collection of related statutes within a legal code. The chapter node 602 is associated with a "HAS" relationship to section nodes 604 and 606, signifying that the chapter encompasses the content detailed within these sections. For example, the chapter node 602 may correspond to a chapter of the California Penal Code, and the section nodes 604 and 606 may represent specific parts or articles within that chapter.

The section node 604 is an embodiment of a document that belongs to the chapter node 602, as indicated by the "BELONGS_TO" relationship. This node is further associated with a "HAS" relationship to a plurality of sub-section nodes, specifically sub-section nodes 608, 610, and 612. Each sub-section node represents a more granular piece of information or a specific provision within the section. For instance, sub-section node 608 may correspond to a particular statute regarding the procedure for arrest, sub-section node 610 may detail the penalties for a defined offense, and sub-section node 612 might outline the conditions under which a legal petition can be filed.

In another embodiment, the section node 604 may be utilized to store and retrieve information pertinent to a user query regarding animal cruelty laws. The sub-section nodes 608, 610, and 612 could then contain specific legal provisions, penalties, and procedural guidelines related to such offenses, respectively. These nodes are connected to the section node 604 through "BELONGS_TO" relationships.

Similarly, section node 606 is another embodiment of a document that is part of the chapter node 602 and is connected to sub-section nodes 614 and 616. The "BELONGS_TO" relationship between section node 606 and chapter node 602 indicates that the content of section node 606 is a subset of the broader topic covered by the chapter. Sub-section node 614 may contain information regarding the adulteration of food products, while sub-section node 616 might provide details on the legal repercussions for such actions.

In an alternative embodiment, section node 606 could be associated with a user query about regulations pertaining to food safety. Sub-section nodes 614 and 616 would then be leveraged to provide the user with precise legal text and associated penalties, respectively. The structured nature of the knowledge graph 600 allows for the efficient clustering and retrieval of information based on the interconnectedness of the nodes, as described in the claims.

Referring to FIG. 7, an exemplary embodiment of an NxN distance matrix 700 is depicted, illustrating the calculated shortest-path distances between each pair of nodes within the knowledge graph 600, as shown in FIG. 6. The knowledge graph 600, as previously described, represents a structured and hierarchical approach to information storage and retrieval, where nodes correspond to documents or portions thereof, such as chapters, sections, or sub-sections of a legal code, educational material, or any other domain-specific repository of information.

The NxN distance matrix 700 is a symmetrical and square matrix that encapsulates the interconnectedness and relative distances between nodes in the knowledge graph 600. Each entry in the matrix represents the shortest-path distance between a pair of nodes, calculated using a pathfinding algorithm such as Dijkstra's algorithm. The distances are indicative of the degree of relatedness between the content of the documents corresponding to the nodes, with shorter distances suggesting stronger contextual relationships.

In the disclosed embodiment, the NxN distance matrix 700 includes vectors for each node in the knowledge graph 600, with the first vector corresponding to the chapter node 602 and subsequent vectors corresponding to section nodes 604 and 606, as well as sub-section nodes 608, 610, 612, 614, and 616. The first vector, associated with chapter node 602, is [0, 1, 1, 2, 2, 2, 2, 2], which serves as both the first row and the first column of the NxN distance matrix 700 due to its symmetrical nature. This vector indicates that the chapter node 602 has a distance of 0 from itself, a distance of 1 from both section nodes 604 and 606, and a distance of 2 from all sub-section nodes 608, 610, 612, 614, and 616.

The second vector, corresponding to section node 604, is [1, 0, 2, 1, 1, 1, 3, 3], reflecting that section node 604 is at a distance of 1 from chapter node 602, a distance of 0 from itself, a distance of 2 from section node 606, distances of 1 from sub-section nodes 608, 610, and 612, and distances of 3 from sub-section nodes 614 and 616. Similarly, the third vector for section node 606 is [1, 2, 0, 3, 3, 3, 1, 1], and so on for the remaining vectors corresponding to the sub-section nodes.

The NxN distance matrix 700 enables the identification of the largest cluster of nodes based on the shortest-path distances. By employing a clustering algorithm, such as k-means, the system groups the nodes into clusters within an N-dimensional space. The largest cluster is determined by the cluster containing the greatest number of nodes from the set of similar documents, as retrieved based on the similarity score between the query embedding and the document embeddings stored in the vector database. This graph-interconnectedness based clustering mechanism represents a significant advancement over existing RAG approaches, as it effectively filters out anomalies and outliers that may be contextually distant, despite a high semantic similarity score. The current disclosure thus enables improved information retrieval that is particularly beneficial in domains where the accuracy and reliability of chatbot responses are highly desired.

It will be appreciated that the simplicity of NxN distance matrix 700 shown in FIG. 7 is to simplify illustration and description of the salient concepts, but in practice the distance matrices may comprise a substantially larger number of nodes, and may include non-integer distances, such as in cases where inter-node distances use an edge based weighting mechanism which may result in non-integer distances. Further, the example shown in FIG. 7 includes all nodes in exemplary knowledge graph 600, however in practice the N nodes used in determination of the NxN distance matrix may be separated by substantially any number of intervening nodes which are not included in the set of N most similar documents/information sources.

The disclosure also provides support for a method comprising: receiving a user query, generating a query embedding for the user query using a trained embedding model, accessing a knowledge graph stored in a graph database, wherein the knowledge graph includes a plurality of nodes representing documents, the plurality of nodes associated with a plurality of document embeddings, wherein each node is associated with a document embedding from the plurality of document embeddings that characterizes content of a document corresponding to the node, retrieving a set of N documents, where N is a positive integer greater than one, based on a similarity score between the query embedding and the plurality of document embeddings of the plurality of nodes in the knowledge graph, constructing a distance matrix by calculating a plurality of shortest-path distances between each pair of nodes corresponding to the set of N documents, clustering the N documents based on the distance matrix to identify a largest cluster of nodes, retrieving content from the largest cluster of nodes, and formulating a response to the user query based on the retrieved content, wherein the response is prepared for display on a user interface. In a first example of the method the method further comprising: receiving a document, generating a document embedding for the received document using the trained embedding model, adding a new node to the knowledge graph in the graph database, wherein the new node represents the received document and is associated with the generated document embedding, establishing a plurality of relationships between the new node and existing nodes in the knowledge graph based on a similarity score between the document embedding of the new node and the document embeddings of the existing nodes, updating the knowledge graph to include the new node and the established relationships. In a second example of the method, optionally including the first example, establishing relationships between the new node and existing nodes further comprises extracting one or more substrings from the content of the received document, identifying corresponding nodes in the knowledge graph that satisfy a pre-determined relationship type based on the extracted substrings, and creating edges in the knowledge graph that link the new node to the identified corresponding nodes with the pre-determined relationship type. In a third example of the method, optionally including one or both of the first and second examples, the knowledge graph is formed by: receiving a plurality of documents, generating a document embedding for each document of the plurality of documents using the trained embedding model, adding a respective node to the knowledge graph in the graph database for each document of the plurality of documents, wherein each respective node is associated with a corresponding document embedding that characterizes content of the document, establishing relationships between nodes in the knowledge graph based on one or more extracted substrings from the content of the plurality of documents and a pre-determined node schema, wherein the relationships are indicative of content-based associations between the documents, and updating the knowledge graph to include each respective node and the established relationships. In a fourth example of the method, optionally including one or more or each of the first through third examples, retrieving the set of N documents based on the similarity score between the query embedding and the plurality of document embeddings of the plurality of nodes in the knowledge graph further comprises employing cosine similarity to determine the similarity score. In a fifth example of the method, optionally including one or more or each of the first through fourth examples, constructing the distance matrix by calculating the plurality of shortest-path distances between each pair of nodes corresponding to the set of N documents further comprises utilizing Dijkstra's algorithm to determine the plurality of shortest-path distances. In a sixth example of the method, optionally including one or more or each of the first through fifth examples, clustering the N documents based on the distance matrix to identify the largest cluster of nodes further comprises applying a k-means clustering algorithm to group the nodes into clusters.

The disclosure also provides support for a method comprising: receiving a user query, generating a query embedding for the user query using a trained embedding model, accessing a vector database, wherein the vector database stores a plurality of document embeddings, each document embedding characterizing content of a document and being uniquely associated with a corresponding node in a knowledge graph stored in a graph database, wherein the knowledge graph includes a plurality of nodes representing documents, retrieving a set of N similar documents based on a similarity score between the query embedding and the plurality of document embeddings stored in the vector database, constructing an N×N distance matrix by calculating a plurality of shortest-path distances between each pair of nodes corresponding to the set of N similar documents in the knowledge graph, clustering the N similar documents based on the N×N distance matrix to identify a largest cluster of nodes, retrieving content from the largest cluster of nodes, and formulating a response to the user query based on the retrieved content, wherein the response is prepared for display on a user interface. In a first example of the method, constructing the N×N distance matrix comprises calculating the plurality of shortest-path distances using Dijkstra's algorithm, wherein each shortest-path distance represents a graph distance between a pair of nodes in the knowledge graph, and wherein the graph distance is indicative of a degree of relatedness between content of the documents corresponding to the pair of nodes. In a second example of the method, optionally including the first example, clustering the N similar documents based on the N×N distance matrix further comprises employing a k-means clustering algorithm to partition the N similar documents into clusters within an N-dimensional space, wherein the largest cluster of nodes is determined by the cluster having a greatest number of nodes from the set of N similar documents. In a third example of the method, optionally including one or both of the first and second examples, the shortest-path distances are weighted based on a relevance metric associated with each edge of the knowledge graph. In a fourth example of the method, optionally including one or more or each of the first through third examples, retrieving the set of N similar documents includes selecting documents with a largest cosine similarity to the query embedding.

The disclosure also provides support for a system for information retrieval in response to a user query, the system comprising: a memory storing instructions, a trained embedding model stored in the memory, a vector database communicably coupled to the memory, wherein the vector database stores a plurality of document embeddings, each document embedding characterizing content of a document and being uniquely associated with a corresponding node in a knowledge graph stored in a graph database, wherein the knowledge graph includes a plurality of nodes representing documents, a processor communicably coupled to the memory and the vector database, wherein, when executing the instructions, the processor is configured to: receive a user query, generate a query embedding for the user query using the trained embedding model, access the vector database to retrieve a set of N similar documents based on a similarity score between the query embedding and the plurality of document embeddings stored in the vector database, construct an N×N distance matrix by calculating a plurality of shortest-path distances between each pair of nodes corresponding to the set of N similar documents in the knowledge graph, cluster the N similar documents based on the N×N distance matrix to identify a largest cluster of nodes, retrieve content from the largest cluster of nodes, and a user interface communicably coupled to the processor, wherein the user interface is configured to display a response to the user query based on the retrieved content. In a first example of the system when executing the instructions, the processor is further configured to: receive a document, generate a document embedding for the received document using the trained embedding model, add a new node to the knowledge graph in the graph database, wherein the new node represents the received document and is associated with the generated document embedding, establish a plurality of relationships between the new node and existing nodes in the knowledge graph based on a similarity score between the document embedding of the new node and the document embeddings of the existing nodes, and update the knowledge graph to include the new node and the established relationships. In a second example of the system, optionally including the first example, establishing relationships between the new node and existing nodes further comprises: extracting one or more substrings from the content of the received document, identifying corresponding nodes in the knowledge graph that satisfy a pre-determined relationship type based on the extracted substrings, and creating edges in the knowledge graph that link the new node to the identified corresponding nodes with the pre-determined relationship type. In a third example of the system, optionally including one or both of the first and second examples, the knowledge graph is formed by: receiving a plurality of documents, generating a document embedding for each document of the plurality of documents using the trained embedding model, adding a respective node to the knowledge graph in the graph database for each document of the plurality of documents, wherein each respective node is associated with a corresponding document embedding that characterizes content of the document, establishing relationships between nodes in the knowledge graph based on one or more extracted substrings from the content of the plurality of documents and a pre-determined node schema, wherein the relationships are indicative of content-based associations between the documents, and updating the knowledge graph to include each respective node and the established relationships. In a fourth example of the system, optionally including one or more or each of the first through third examples, the processor is further configured to update the knowledge graph by adding new nodes and establishing relationships between the new nodes and existing nodes based on a threshold similarity score, wherein the threshold similarity score is determined by a percentile rank within a distribution of similarity scores across the knowledge graph. In a fifth example of the system, optionally including one or more or each of the first through fourth examples, the processor is further configured to refine the query embedding by incorporating context from a user's previous queries and interactions with the system, based on temporal and topical relevance. In a sixth example of the system, optionally including one or more or each of the first through fifth examples, the processor is further configured to prioritize retrieval of content from nodes in the largest cluster based on a number of connections to other nodes in the largest cluster. In a seventh example of the system, optionally including one or more or each of the first through sixth examples when executing the instructions, the processor is further configured to: generate the response to the user query by: selecting content from the retrieved content of the largest cluster of nodes, forming a context for the user query based on the selected content, generating a prompt comprising the context and the user query, and providing the response to the user interface for display.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

While the foregoing is directed to embodiments of the present disclosure, other and further embodiments of the disclosure may be devised without departing from the basic scope thereof, and the scope thereof is determined by the claims that follow.

The invention claimed is:

1. A method comprising:
receiving a user query;
generating a query embedding for the user query using a trained embedding model;
accessing a knowledge graph stored in a graph database, wherein the knowledge graph includes a plurality of nodes representing documents, the plurality of nodes associated with a plurality of document embeddings, wherein each node is associated with a document embedding from the plurality of document embeddings that characterizes content of a document corresponding to the node;
retrieving a set of N documents, where N is a positive integer greater than one, based on a similarity score between the query embedding and the plurality of document embeddings of the plurality of nodes in the knowledge graph;
constructing a distance matrix by calculating a plurality of shortest-path distances between each pair of nodes corresponding to the set of N documents;
clustering the N documents based on the distance matrix to identify a largest cluster of nodes;
retrieving content from the largest cluster of nodes; and
formulating a response to the user query based on the retrieved content, wherein the response is prepared for display on a user interface.

2. The method of claim 1, the method further comprising:
receiving a document;
generating a document embedding for the received document using the trained embedding model;
adding a new node to the knowledge graph in the graph database, wherein the new node represents the received document and is associated with the generated document embedding;
establishing a plurality of relationships between the new node and existing nodes in the knowledge graph based on a similarity score between the document embedding of the new node and the document embeddings of the existing nodes;

updating the knowledge graph to include the new node and the established relationships.

3. The method of claim 2, wherein establishing relationships between the new node and existing nodes further comprises extracting one or more substrings from the content of the received document, identifying corresponding nodes in the knowledge graph that satisfy a pre-determined relationship type based on the extracted substrings, and creating edges in the knowledge graph that link the new node to the identified corresponding nodes with the pre-determined relationship type.

4. The method of claim 1, wherein the knowledge graph is formed by:
receiving a plurality of documents;
generating a document embedding for each document of the plurality of documents using the trained embedding model;
adding a respective node to the knowledge graph in the graph database for each document of the plurality of documents, wherein each respective node is associated with a corresponding document embedding that characterizes content of the document;
establishing relationships between nodes in the knowledge graph based on one or more extracted substrings from the content of the plurality of documents and a pre-determined node schema, wherein the relationships are indicative of content-based associations between the documents; and
updating the knowledge graph to include each respective node and the established relationships.

5. The method of claim 1, wherein retrieving the set of N documents based on the similarity score between the query embedding and the plurality of document embeddings of the plurality of nodes in the knowledge graph further comprises employing cosine similarity to determine the similarity score.

6. The method of claim 1, wherein constructing the distance matrix by calculating the plurality of shortest-path distances between each pair of nodes corresponding to the set of N documents further comprises utilizing Dijkstra's algorithm to determine the plurality of shortest-path distances.

7. The method of claim 1, wherein clustering the N documents based on the distance matrix to identify the largest cluster of nodes further comprises applying a k-means clustering algorithm to group the nodes into clusters.

8. A method comprising:
receiving a user query;
generating a query embedding for the user query using a trained embedding model;
accessing a vector database, wherein the vector database stores a plurality of document embeddings, each document embedding characterizing content of a document and being uniquely associated with a corresponding node in a knowledge graph stored in a graph database, wherein the knowledge graph includes a plurality of nodes representing documents;
retrieving a set of N similar documents based on a similarity score between the query embedding and the plurality of document embeddings stored in the vector database;
constructing an N×N distance matrix by calculating a plurality of shortest-path distances between each pair of nodes corresponding to the set of N similar documents in the knowledge graph;
clustering the N similar documents based on the N×N distance matrix to identify a largest cluster of nodes;
retrieving content from the largest cluster of nodes; and
formulating a response to the user query based on the retrieved content, wherein the response is prepared for display on a user interface.

9. The method of claim 8, wherein constructing the N×N distance matrix comprises calculating the plurality of shortest-path distances using Dijkstra's algorithm, wherein each shortest-path distance represents a graph distance between a pair of nodes in the knowledge graph, and wherein the graph distance is indicative of a degree of relatedness between content of the documents corresponding to the pair of nodes.

10. The method of claim 9, wherein clustering the N similar documents based on the N×N distance matrix further comprises employing a k-means clustering algorithm to partition the N similar documents into clusters within an N-dimensional space, wherein the largest cluster of nodes is determined by the cluster having a greatest number of nodes from the set of N similar documents.

11. The method of claim 8, wherein the shortest-path distances are weighted based on a relevance metric associated with each edge of the knowledge graph.

12. The method of claim 8, wherein retrieving the set of N similar documents includes selecting documents with a largest cosine similarity to the query embedding.

13. A system for information retrieval in response to a user query, the system comprising:
a memory storing instructions;
a trained embedding model stored in the memory;
a vector database communicably coupled to the memory, wherein the vector database stores a plurality of document embeddings, each document embedding characterizing content of a document and being uniquely associated with a corresponding node in a knowledge graph stored in a graph database, wherein the knowledge graph includes a plurality of nodes representing documents;
a processor communicably coupled to the memory and the vector database, wherein, when executing the instructions, the processor is configured to:
receive a user query;
generate a query embedding for the user query using the trained embedding model;
access the vector database to retrieve a set of N similar documents based on a similarity score between the query embedding and the plurality of document embeddings stored in the vector database;
construct an N×N distance matrix by calculating a plurality of shortest-path distances between each pair of nodes corresponding to the set of N similar documents in the knowledge graph;
cluster the N similar documents based on the N×N distance matrix to identify a largest cluster of nodes;
retrieve content from the largest cluster of nodes; and
a user interface communicably coupled to the processor, wherein the user interface is configured to display a response to the user query based on the retrieved content.

14. The system of claim 13, wherein, when executing the instructions, the processor is further configured to:
receive a document;
generate a document embedding for the received document using the trained embedding model;

add a new node to the knowledge graph in the graph database, wherein the new node represents the received document and is associated with the generated document embedding;

establish a plurality of relationships between the new node and existing nodes in the knowledge graph based on a similarity score between the document embedding of the new node and the document embeddings of the existing nodes; and update the knowledge graph to include the new node and the established relationships.

15. The system of claim 14, wherein establishing relationships between the new node and existing nodes further comprises:

extracting one or more substrings from the content of the received document;

identifying corresponding nodes in the knowledge graph that satisfy a pre-determined relationship type based on the extracted substrings; and creating edges in the knowledge graph that link the new node to the identified corresponding nodes with the pre-determined relationship type.

16. The system of claim 13, wherein the knowledge graph is formed by:

receiving a plurality of documents;

generating a document embedding for each document of the plurality of documents using the trained embedding model;

adding a respective node to the knowledge graph in the graph database for each document of the plurality of documents, wherein each respective node is associated with a corresponding document embedding that characterizes content of the document;

establishing relationships between nodes in the knowledge graph based on one or more extracted substrings from the content of the plurality of documents and a pre-determined node schema, wherein the relationships are indicative of content-based associations between the documents; and updating the knowledge graph to include each respective node and the established relationships.

17. The system of claim 13, wherein the processor is further configured to update the knowledge graph by adding new nodes and establishing relationships between the new nodes and existing nodes based on a threshold similarity score, wherein the threshold similarity score is determined by a percentile rank within a distribution of similarity scores across the knowledge graph.

18. The system of claim 13, wherein the processor is further configured to refine the query embedding by incorporating context from a user's previous queries and interactions with the system, based on temporal and topical relevance.

19. The system of claim 13, wherein the processor is further configured to prioritize retrieval of content from nodes in the largest cluster based on a number of connections to other nodes in the largest cluster.

20. The system of claim 13, wherein, when executing the instructions, the processor is further configured to:

generate the response to the user query by:

selecting content from the retrieved content of the largest cluster of nodes;

forming a context for the user query based on the selected content;

generating a prompt comprising the context and the user query; and providing the response to the user interface for display.

* * * * *